US006628669B1

(12) United States Patent
Kago

(10) Patent No.: US 6,628,669 B1
(45) Date of Patent: Sep. 30, 2003

(54) LAN RELAYING/SWITCHING APPARATUS

(75) Inventor: Hiroaki Kago, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/412,290

(22) Filed: Oct. 5, 1999

(30) Foreign Application Priority Data

Mar. 18, 1999 (JP) .......................................... 11-073671

(51) Int. Cl.$^7$ ................................................. H04J 3/16
(52) U.S. Cl. ............. 370/468; 370/395.41; 370/395.42; 370/235; 709/314; 709/226; 709/103
(58) Field of Search ...................... 370/395.4, 395.41, 370/395.42, 395.43, 395.5, 395.51, 395.52, 395.61, 395.63, 395.64, 395.65, 401, 411, 412, 420, 422, 426, 468, 469, 235; 709/223, 226, 213, 238, 311, 314, 103

(56) References Cited

U.S. PATENT DOCUMENTS 5,926,458 A * 7/1999 Yin ............................. 370/230
6,067,301 A * 5/2000 Aatresh ....................... 370/418
6,246,691 B1 * 6/2001 Briem et al. ................. 370/412
6,414,963 B1 * 7/2002 Gemar ........................ 370/412
6,473,815 B1 * 10/2002 Lu et al. ....................... 710/52
6,504,819 B2 * 1/2003 Fowler et al. ............... 370/230

* cited by examiner

Primary Examiner—Kenneth Vanderpuye
Assistant Examiner—Van Nguyen
(74) Attorney, Agent, or Firm—Katten Muchin Zavis & Rosenman

(57) ABSTRACT

In a LAN relaying/switching apparatus which can guarantee data to be transmitted, a predetermined amount of transmission line bandwidth is set to a bandwidth control queue unit for a the data flows with a top priority, a remaining transmission line bandwidth is secured for a priority control queue unit according to the order of priority of the remaining data flows. A controller performs a read processing of the priority control queue unit at a timing different from a timing of reading the bandwidth control queue unit.

12 Claims, 5 Drawing Sheets

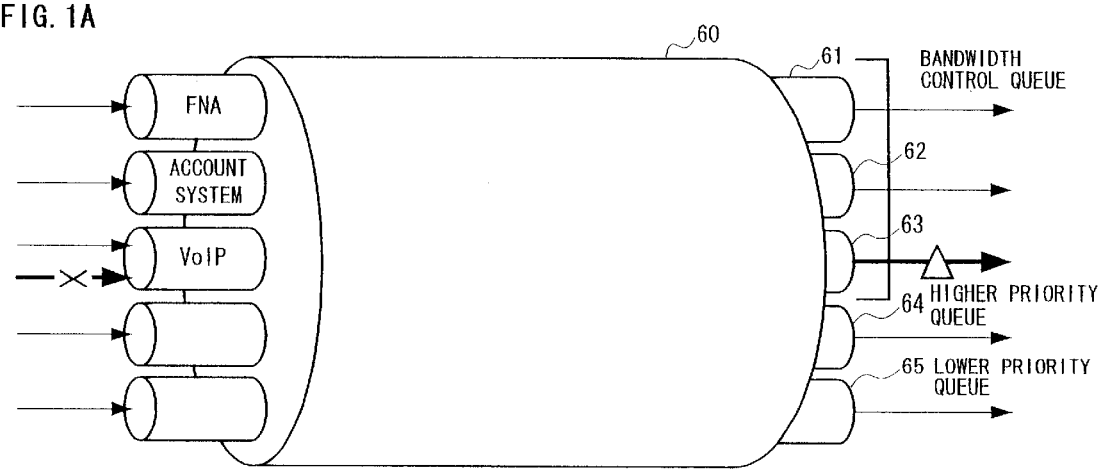
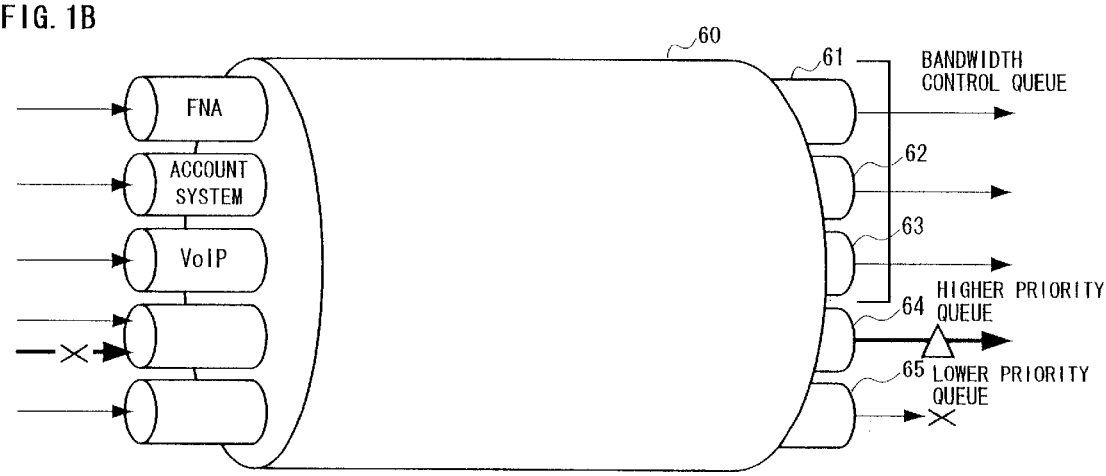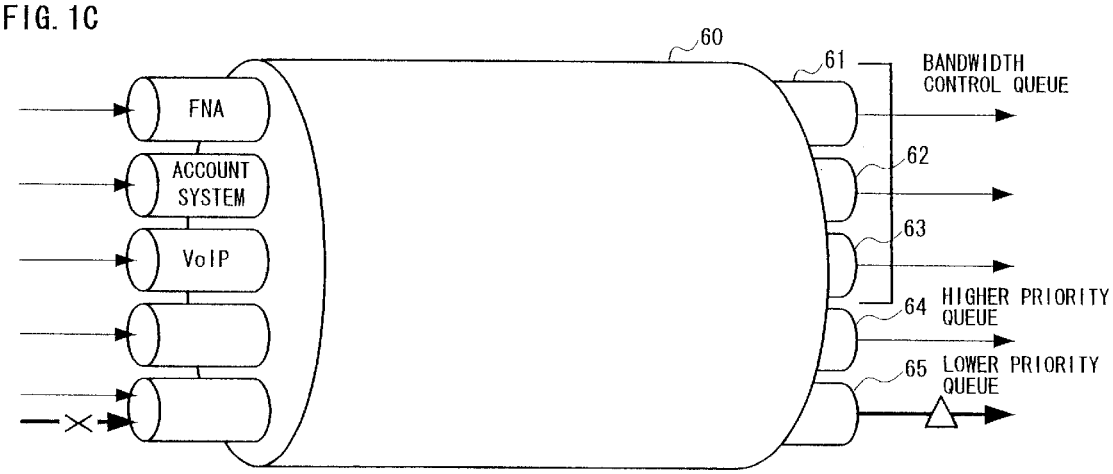

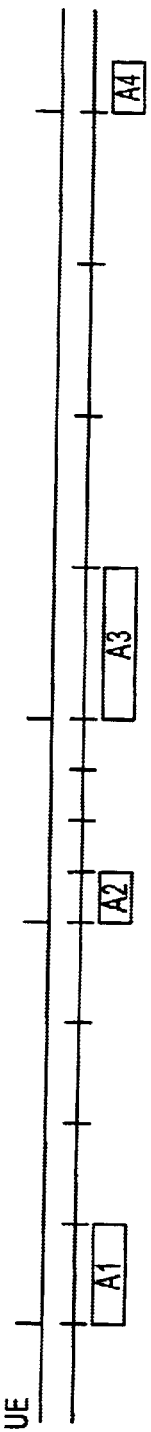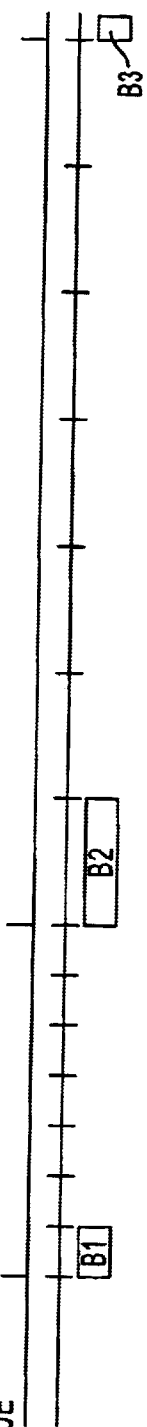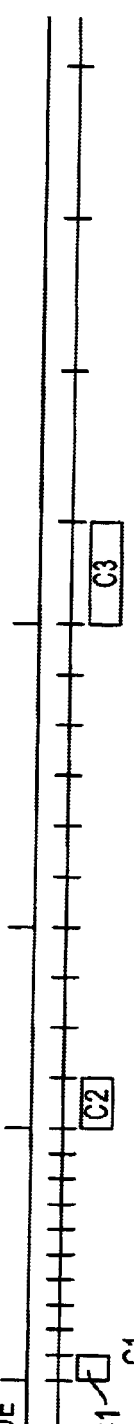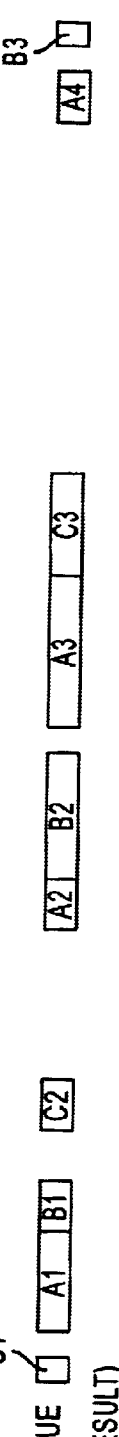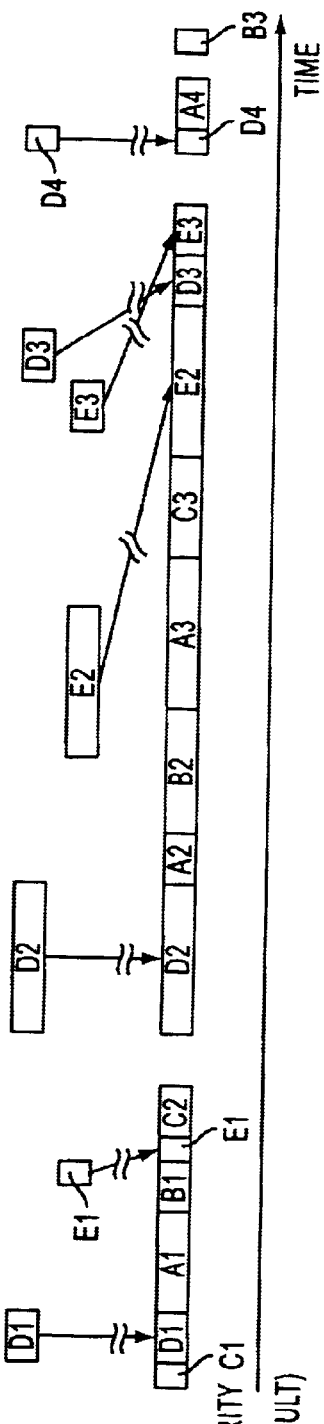
FIG. 5A BANDWIDTH QUEUE UNIT 61 (BAND: 1/4)
FIG. 5B BANDWIDTH QUEUE UNIT 62 (BAND: 1/7)
FIG. 5C BANDWIDTH QUEUE UNIT 63 (BAND: 1/10)
FIG. 5D BANDWIDTH QUEUE UNIT 61~63 (ARBITRATION RESULT)
FIG. 5E PRIORITY QUEUE ALLOCATION
HIGHER PRIORITY QUEUE UNIT 64
LOWER PRIORITY QUEUE UNIT 65
FIG. 5F BANDWIDTH/PRIORITY QUEUE UNIT 61~65 (ARBITRATION RESULT)

LAN RELAYING/SWITCHING APPARATUS

BACKGROUND OF THE INVENTION

1. Field of the Invention

The present invention relates to a LAN relaying/switching apparatus, and in particular to a LAN relaying/switching apparatus which can guarantee data to be transmitted.

In the LAN relaying/switching apparatus, even if a transmission line fault occurs in a specific data flow, it is desirable to guarantee the data with the least influence on the data of other data flows.

2. Description of the Related Art

As a control method to guarantee data to be transmitted, a "bandwidth control method" and a "priority control method" have been known so far. Particularly, the bandwidth control method is one for preliminarily allocating the band of a LAN transmission line to each data flow and guaranteeing a data transmission so far as the reserved bandwidth. Also, the priority control method is one for efficiently using the band of the LAN transmission line and guaranteeing the transmission of data with a higher priority by relatively enhancing the processing priority for an important data flow as compared to that for other data flows.

Recent LAN environments have increased data flows which always require the guarantee of a transmission bandwidth such as that for voice and motion pictures (video). In such a case, the above-mentioned bandwidth control method is the best in that the data transmission is guaranteed up to the reserved bandwidth.

However, the bandwidth control method is disadvantageous in that a transmission line cannot be efficiently used since a fixed transmission line band is occupied without fail regardless of whether or not the transmission line band is actually used.

On the other hand, the above-mentioned priority control method makes it possible to efficiently use the transmission line since the transmission of data is guaranteed according to the priority. However, this method may not attend to the case where a fixed transmission band is required to be guaranteed such as for the above-mentioned voice and motion pictures.

SUMMARY OF THE INVENTION

It is accordingly an object of the present invention to provide a LAN relaying/switching apparatus which can guarantee data to be transmitted and efficiently use a transmission line band by combining a bandwidth control method and a priority control method.

In order to achieve the above-mentioned object, a LAN relaying/switching apparatus, of the present invention includes; at least one bandwidth control queue unit, a priority control queue unit, and a controller for setting a predetermined transmission line band part for a part of the data flows to the bandwidth control queue unit with a top priority, securing a remaining transmission line bandwidth part in the priority control queue unit according to the priority orders for the remaining data flows, and performing a read processing of the priority control queue unit at a timing different from a timing of reading the bandwidth control queue unit.

Such a principle of the present invention will be described by referring to FIGS. 1A–1C.

In FIG. 1A, there are provided five queue units 61–65 in all, to which predetermined data flows are assumed to be allocated respectively. To the bandwidth control queue units 61–63 among these queue units 61–65, a data flow FNA, an account system, and a VoIP are allocated and predetermined transmission line band parts are reserved, respectively. The controller guarantees the data flow FNA, the account system, and the VoIP for the respective reserved bands with a top priority.

The higher priority control queue units 64 transmits the remaining data flows by the remaining band parts according to the priority of the data flows. It is to be noted that the higher priority control queue unit 64 and the lower priority control queue unit 65 are illustrated to present a priority control, while the latter is especially illustrated to have no priority at all and to be given no bandwidth guarantee.

Thus, for the data flows of the bandwidth control queue units 61–63 which require the bandwidth guarantee, a data transmission up to the reserved bandwidth is guaranteed. For the data flows of the priority control queue units 64 and 65 with priority, the data transmission is guaranteed so far as the transmission line bandwidth from which the sum of the bandwidths allocated to the bandwidth transmission line queue units 61–63 is subtracted, so that it becomes possible to transmit the data according to the priority within that limited bandwidth.

In this case, the controller can perform read processings of the priority control queue units 64 and 65 while read timings of the bandwidth control queue units 61–63 are not generated. Accordingly, it becomes possible to guarantee the band of read data of the bandwidth control queue units 61–63 and to transmit read data of the priority control queue unit 64 in the absence of the former read data, thereby enabling the transmission line to be efficiently used.

Also, in the present invention, the controller may control both of the queue units independent of each other.

Namely, as illustrated in FIG. 1A, when a jam occurs at the bandwidth control queue unit 63, the jammed flow should not be transmitted with the band allocated to the priority control queue unit 64 in order to eliminate the jam.

Also, as illustrated in FIG. 1B, when a jam occurs at the priority control queue unit 64 conversely, the data flow for the priority control should not be transmitted with the bandwidth allocated to the bandwidth control queue units 61–63 in order to eliminate the jam.

Furthermore, it is a matter of course, as illustrated in FIG. 1C, that the data flow should not be transmitted with the band allocated to the bandwidth control queue units 61–63 and the priority control queue unit 64 when a jam occurs in the data flow of the lower priority control queue unit 65.

Also, in the present invention, when there are a plurality of bandwidth control queue units, the controller may control each of the bandwidth control queue units independent of each other.

Namely, when there are provided a plurality of bandwidth control queue units 61–63 as illustrated in FIG. 1A, the data flow of e.g. the bandwidth control queue unit 63 where a jam has occurred among the portions 61–63 is not transmitted with the bandwidth allocated to the other bandwidth control queue units 61 and 62 where a jam does not occur.

According to the present invention of, it is possible to prevent a transmission fault which has occurred in a specific data flow from spreading to other data flows.

Also, in the present invention, when there is a blank in the transmission line bandwidth, the controller may extend a setting bandwidth of the bandwidth control queue unit so as to fill a blank bandwidth.

Namely, it is possible to extend the present bandwidth of the bandwidth control queue unit by using a bandwidth which the bandwidth control queue unit and the priority control queue unit do not use at the moment.

Thus, it becomes possible to efficiently use a blank bandwidth of a LAN transmission line which occurs due to the variation of data lengths, data arrival intervals, and the like in a data flow.

Also, in the present invention, when there is a blank of the bandwidth in the bandwidth control queue unit, a bandwidth of the priority control queue unit may be extended.

Also, in the present invention, the controller may identify a data flow of the bandwidth control queue unit by an MAC address.

Also, in the present invention, the controller may identify a data flow of the bandwidth control queue unit by at least one of a VP or a VC at an ATM.

Also, in the present invention, the controller may identify a data flow of each of the bandwidth control queue units by a protocol classification in IEEE802.3.

Also, in the present invention, the controller may identify a data flow of the bandwidth control queue unit by an IP address in IPv4.

Also, in the present invention, the controller may identify a data flow of the bandwidth control queue unit by an IP address in IPv4 and a port number of either a TCP or a UDP.

Also, in the present invention, the controller may identify a data flow of the bandwidth control queue unit by an IP address in IPv6.

Also, in the present invention, the controller may identify a data flow of each of the bandwidth control queue units by a flow label in IPv6.

Namely, in the present invention, the controller can identify the data flow based on the MAC address, the VP and the VC, the protocol classification, the IP address in the Ipv4, the port number of either the TCP or the UDP, the IP address in the Ipv6, and the flow label in the Ipv6, respectively included in the data flow.

BRIEF DESCRIPTION OF THE DRAWINGS

FIGS. 1A–1C are diagrams illustrating a principle of a LAN relaying/switching apparatus according to the present invention;

FIGS. 5A–5F are diagrams illustrating output timings of a frame from a queue unit of a LAN relaying/switching apparatus according to the present invention.

Throughout the figures, like reference numerals indicate like or corresponding components.

DESCRIPTION OF THE EMBODIMENTS

Figure 2:
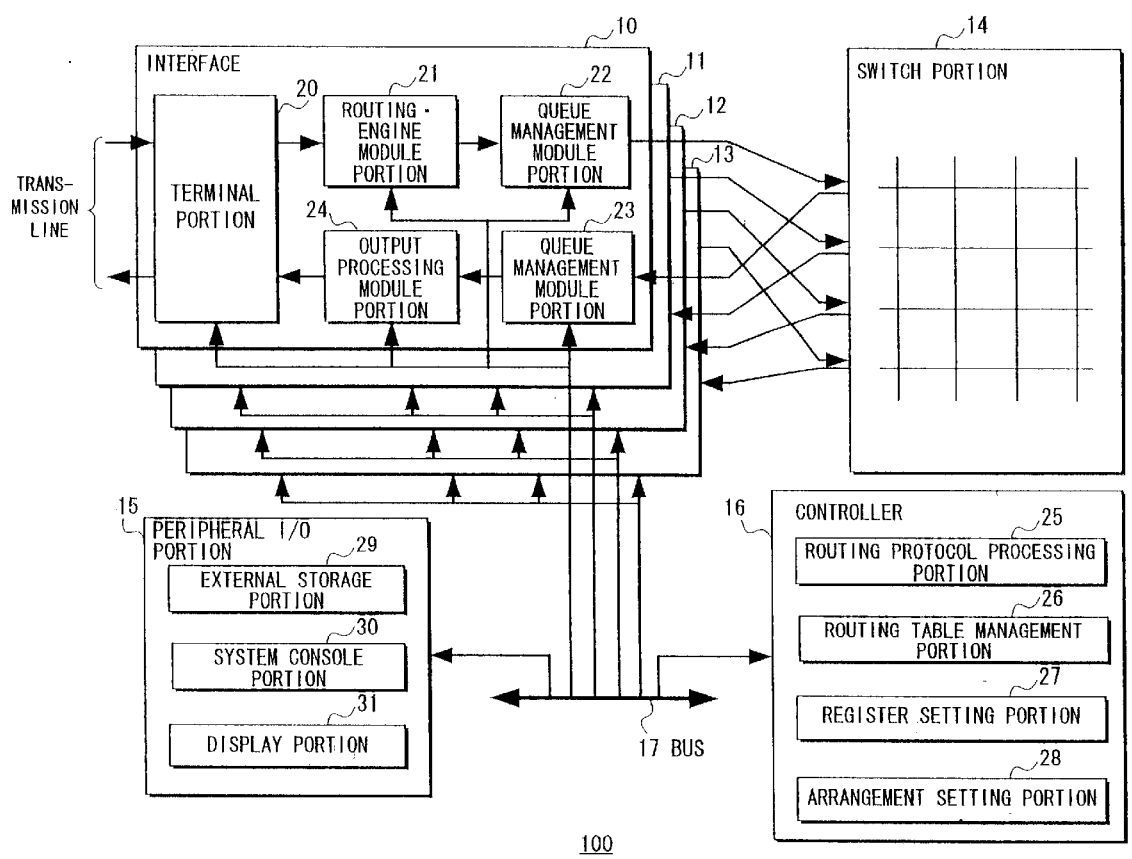
FIG. 2 is a block diagram illustrating an embodiment of a LAN relaying/switching apparatus according to the present invention.

FIG. 2 shows an embodiment of a LAN relaying/switching apparatus according to the present invention. In this embodiment, a LAN relaying/switching apparatus 100 schematically comprises a plurality of (four in this case) interfaces 10–13, a switch portion 14, a peripheral I/O portion 15, a controller 16 composed of a CPU and the like, and a bus 17 commonly connected to the above-mentioned portions.

The interfaces 10–13 are provided corresponding to various kinds of data flows, protocols and the like, each of which is respectively composed of a terminal portion 20, a routing engine module portion 21, queue management module portions 22 and 23, and an output processing module portion 24.

Specifically, the terminal portion 20 converts an optical signal packet transmitted from the transmission line into an electrical signal if the transmission line is an optical fiber so that the packet can be processed in the apparatus 100 as the electrical signal.

Also, the terminal portion 20 forms an interface with an external apparatus (not shown) in a physical layer or a data link layer, and has a function of performing a format conversion into a frame form processed within the apparatus 100 in order that the frame used on the transmission line may not be different in form from an MAC frame, an IP frame processed, and the like within the apparatus for the detection of an error and the like generated in the middle of the transmission line.

In order to determine the transmission line on the transmission side, the routing engine module portion 21 retrieves a routing information table (not shown) stored therein with the information of the MAC address and the IP address of a transmitted frame as a key and determines the transmission line to be used.

The queue management module portion 22 holds a frame for the queuing operation until a path is set up to the interface where the determined transmission line on the transmission side exists.

In this case, it is necessary to send a path setup request to the switch portion 14.

The queue management module portion 22 can send this path setup request based on the frame within the queue unit which will be described later. Also, this path setup request may be made by separately preparing a queue unit for the interface on the transmission side in the module portion 22 so that the queue management module portion 23 on the transmission side has an access to that queue unit of the module portion 22 on the reception side in a predetermined opportunity. It is to be noted that while various kinds of path setup methods are known, the present invention is not limited to those methods.

In addition, the switch portion 14 sets up a path which transmits a frame from the queue management module portion 22 on the reception side to the queue management module portion 23 on the transmission side.

The queue management module portion 23 on the transmission side receives a frame from the queue management module portion 22 on the reception side. In the state where the frame can be transmitted to the transmission line on the transmission side, the queue management module portion 23 sends the frame to the output processing module portion 24.

The output processing module portion 24 performs processings for the MAC frame and the IP frame such as a filtering and an address rewriting operation to provide the frames to the terminal portion 20, which then converts the frame formats into those on the transmission line to be transmitted.

The peripheral I/O portion 15 is composed of an external storage portion 29 such as a floppy disk, a system console portion 30, and a display portion 31 such as an LED.

Furthermore, the controller 16 is composed of a routing protocol processing portion 25, a routing table management portion 26, a register setting portion 27, and an arrangement setting portion 28.

Figure 3:
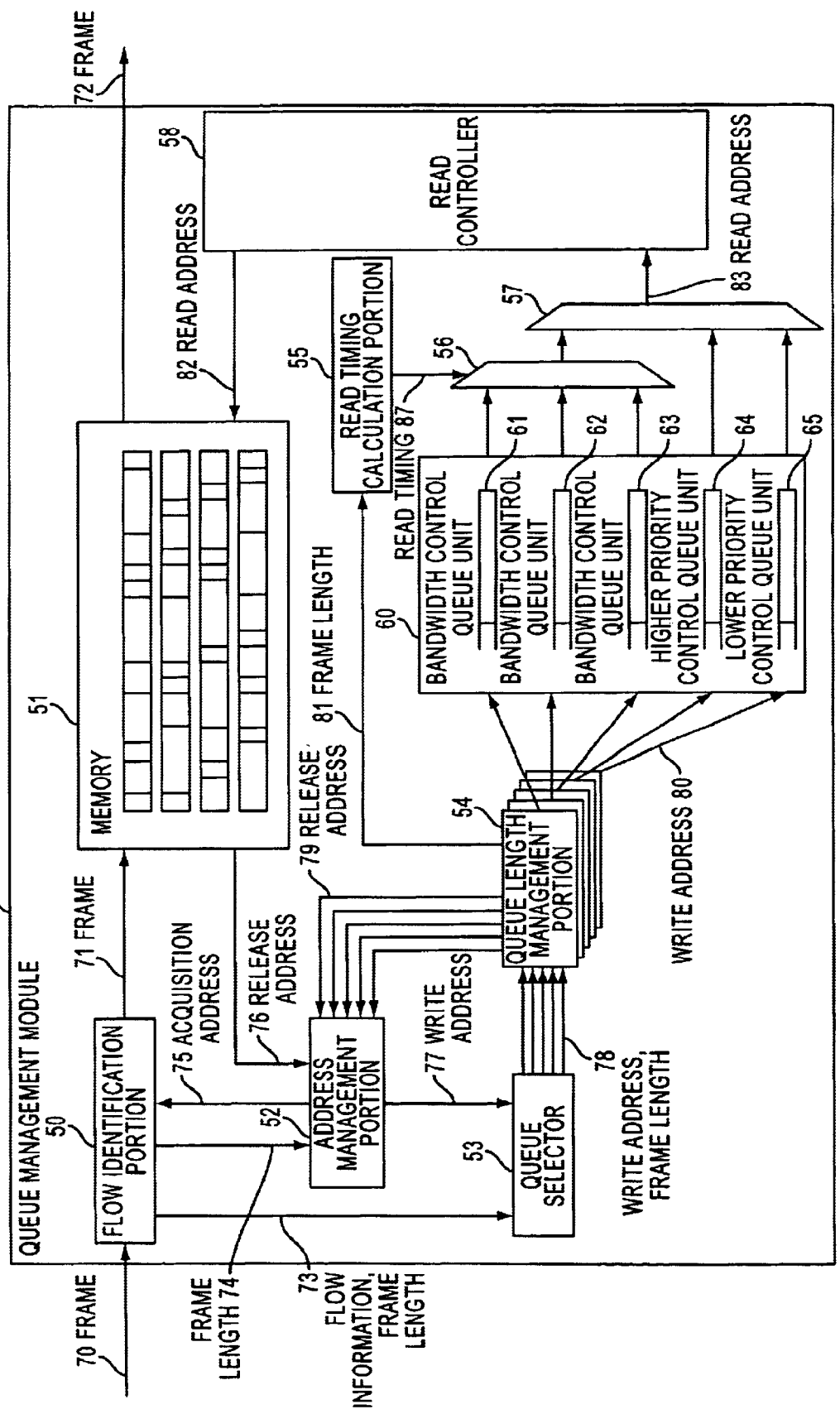
FIG. 3 is a block diagram illustrating an embodiment of a queue management module unit in a LAN relaying/switching apparatus according to the present invention.

FIG. 3 shows an embodiment of the queue management module portions 22 and 23 shown in FIG. 2. In this embodiment, the queue management module portions 22 and 23 are respectively composed of a flow identification portion 50, a memory 51, an address management portion 52, a queue selector 53, queue length management portions 54, a read timing calculation portion 55, a queue unit 60, selectors 56 and 57, and a read controller 58.

Specifically, the flow identification portion 50 identifies information other than that of a receiving destination determined by the above-mentioned routing engine module portion 21 and the like in case the flow identification portion 50 allocates a plurality of queue units to a single receiving destination.

Moreover, the memory 51 stores a frame 71 proper received from the flow identification portion 50 until it is transmitted as a frame 72.

The address management portion 52 manages a blank address and a used address of the memory 51, and notifies an address where a frame is written.

Also, the queue selector 53 selects one of the queue length management portions 54, i.e. any one of the queue units 61–65 for managing the information such as an address and a frame length whose frame proper is stored in the memory 51, based on the data flow identified at the flow identification portion 50.

Each of the queue length management portions 54 manages a signal 78 indicative of a write address/frame length from the queue selector 53.

Allocating a plurality of queues to a single receiving destination, the read timing calculation portion 55 calculates an output timing according to the frame length which the queue handles to generate a read timing for each queue.

The queue unit 60 is composed of the bandwidth control queue units 61–63, the higher priority control queue unit 64, and the lower priority control queue unit 65.

Figure 4:
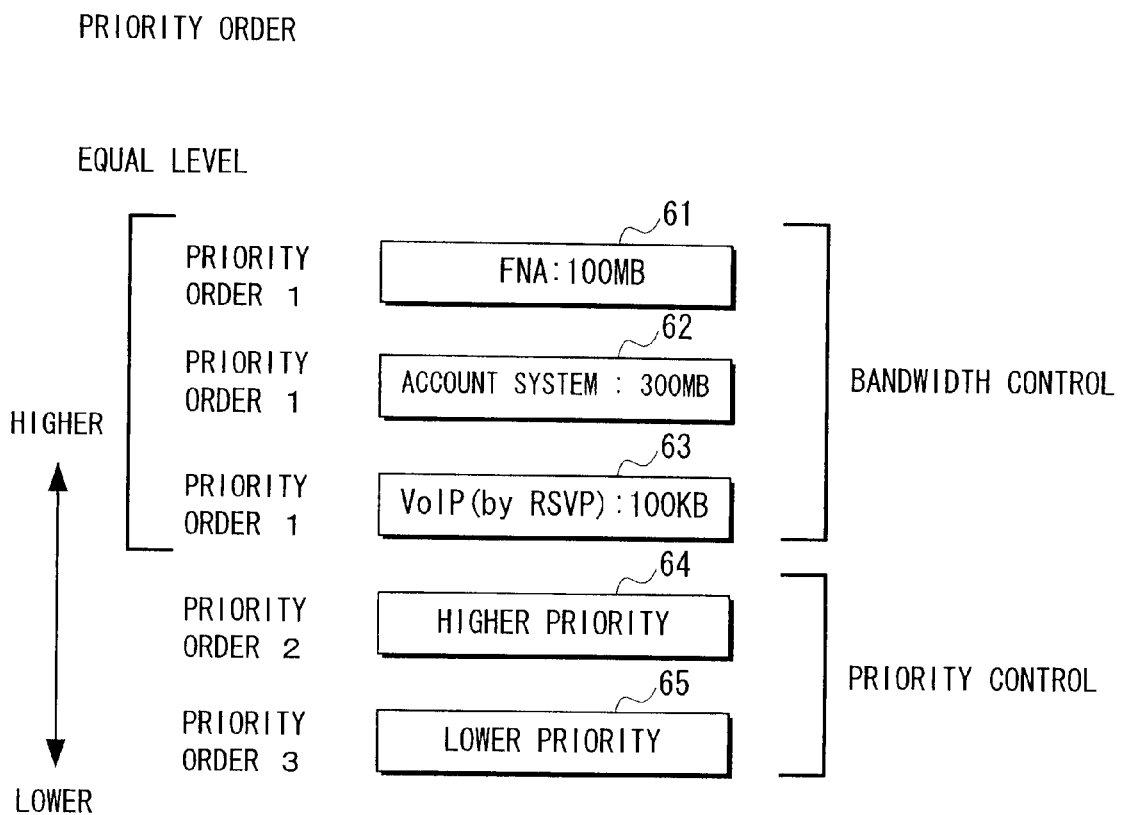
FIG. 4 is a block diagram illustrating an embodiment of a queue unit in a LAN relaying/switching apparatus according to the present invention.

As shown in FIG. 4, the bandwidth control queue units 61–63 all have a priority order "1", to which a data flow FNA (100 MB), an account system (300 MB), and a VoIP (100 KB) are respectively allocated. In addition, a priority order "2" is allocated to the priority control queue unit 64, so that a priority order "3" which means the lowest priority or the least priority is allocated to the lower priority control queue unit 65. It is to be noted that each of the five queue length management portions 54 respectively has the five queue units 61–65, while they are shown in common for the sake of simplification.

The selector 56 selects data read from the bandwidth control queue units 61–63 by a read timing 87 from the read timing calculation portion 55. The selector 57 is set to preferentially output the data read from the selector 56 and from the priority control queue unit 64 as well as the lower priority control queue unit 65 in a predetermined order (sequentially from top to bottom in the example of FIG. 4).

Also, the read controller 58 receives a read address 83 from the selector 57 and provides a read address 82 to the memory 51, from which the frame 72 is transmitted to the switch portion 14 at the latter stage or the output processing module portion 24. When the transmission is completed, the read controller 58 instructs the memory 51 to release the read address 82.

Hereinafter, a series of operations of such a queue management module portion 23 will be described referring to an output timing example of the frame shown in FIGS. 5A–5F.

When a frame 70 from the module portion 21 or the switch portion 14 is inputted to the flow identification portion 50, the flow identification portion 50 firstly sends a signal 73 which is obtained by extracting the flow information and the frame length from the frame 70 to the queue selector 53 and sends a signal 74 indicating the frame length to the address management portion 52.

Receiving a release address (blank address) 76 from the memory 51 and considering the frame length 74, the address management portion 52 provides an acquisition address 75 to the flow identification portion 50.

This operation enables the flow identification portion 50 to write the frame 71 in the memory 51 based on the acquisition address 75 provided from the address management portion 52.

On the other hand, the address management portion 52 provides the acquisition address 75 given to the flow identification portion 50 to the queue selector 53 as a write address 77 for the memory 51.

The queue selector 53 receives the signal 73 and the write address 77, decides which one of the queue units 61–65 the input frame 70 should be given to by the flow information, and sends the signal 78 indicative of the frame length and the write address to the queue length management portion 54 corresponding to the determined queue unit.

When being notified by the queue selector portion 53 that the input frame 70 belongs to e.g. the data flow FNA shown in FIG. 5A, the queue length management portion 54 stores the write addresses 80 of frames A1, A2, A3, and A4 in the bandwidth control queue unit 61.

In the same way, the write address of each frame is stored in the other queue units 62–65 as shown in FIGS. 5A–F.

Thus, when the write addresses 80 are written in the queue units 61–65 from the queue length management portion 54, a frame length 81 is simultaneously provided to the read timing calculation portion 55.

The read timing calculation portion 55 provides the read timing 87 to the selector 56 in the order of frames C1, A1, B1, C2, . . . etc as a result of arbitration between the band queue units 61–63 as shown in FIG. 5D, and reads the write address 80 for the frames stored in each of the queue units 61–63 from the selector 56.

Since the priority order for outputting data is predetermined depending on which input terminal the data come from, the selector 57 which has received such read data (write addresses) from the selector 56 sends the read address 83 to the read controller 58 with the output data from the selector 56 being given the top priority so that the read controller 58 outputs the frames C1, A1, B1, C2, . . . etc as indicated by the result of the arbitration shown in FIG. 5D by providing the read address 82 to the memory 51, based on the read address 83.

On the other hand, when the write address 80 of a frame D1 for the priority queue unit 64 exists, as shown in FIG. 5E, the read timing 87 is not given to the selector 56 from the read timing calculation portion 55 since no write address of any frame is stored in the bandwidth control queue units 61–63 at the starting-point of the frame D1. Therefore, the read data is not given from the selector 56 to the selector 57.

Accordingly, the data outputted from the priority control queue unit 64 is given to the read controller 58 from the selector 57 in the form of the read address 83 as the top priority data.

As a result, the data read from the memory 51 assume the frames C1, D1, A1, B1, E1, C2, . . . etc as indicated by the result of the arbitration shown in FIG. 5F. Since frames according to the priority control method are used in the absence of frames according to the band control method, the utility of the transmission line is improved.

Also, when the queue length management portion 54 writes the write address 80 for the queue units 61–65 in this way, there are some cases that the queue units 61–65 overflow due to the data flow, so that it is possible for the queue length management portion 54 to detect such an overflow state by monitoring the signal 78 of the frame length and the write address.

At this time, the frame 71 to the memory 51 is to be discarded, the write address is given to the address management portion 52 as a release address 79, so that the address management portion 52 provides the acquisition address 75 again to the flow identification portion 50 in view of the frame length 74.

As described above, a LAN relaying/switching apparatus according to the present invention is arranged such that a predetermined transmission line bandwidth part for a part of the data flows is set to a bandwidth control queue unit with a top priority, a remaining transmission line bandwidth part is secured for the priority control queue unit according to the priority orders for the remaining data flows, and a controller performs a read processing of the priority control queue unit at a timing different from a timing of reading the bandwidth control queue unit. Therefore, the influence of a data flow which has a fault over the network is limited and a reliability of a data transmission can be enhanced. Also, it is possible to enhance the reliability of the data transmission and to simultaneously improve the utility of the LAN transmission line.

I claim:

1. A LAN relaying/switching apparatus where a plurality of data flows exist together comprising;
   at least one bandwidth control queue unit,
   a priority control queue unit, and
   a controller for setting a predetermined amount of transmission line bandwidth to the bandwidth control queue unit for a portion of the data flows with a top priority, securing a remaining amount of transmission line bandwidth to the priority control queue unit according to the priority orders for the remaining data flows, and performing a read processing of the priority control queue unit at a timing different from a timing of reading the bandwidth control queue unit.

2. The LAN relaying/switching apparatus as claimed in claim 1 wherein the controller controls both of the queue units independent of each other.

3. The LAN relaying/switching apparatus as claimed in claim 1 wherein when there are a plurality of bandwidth control queue units, the controller controls each of the bandwidth control queue units independent of each other.

4. The LAN relaying/switching apparatus as claimed in claim 1 wherein when there is a blank in the transmission line bandwidth, the controller extends a setting bandwidth of the bandwidth control queue unit so as to fill a blank bandwidth.

5. The LAN relaying/switching apparatus as claimed in claim 1 wherein when there is a blank of the bandwidth in the bandwidth control queue unit, a bandwidth of the priority control queue unit is extended.

6. The LAN relaying/switching apparatus as claimed in claim 1 wherein the controller identifies a data flow of the bandwidth control queue unit by an MAC address.

7. The LAN relaying/switching apparatus as claimed in claim 1 wherein the controller identifies a data flow of the bandwidth control queue unit by at least one of a VP or a VC at an ATM.

8. The LAN relaying/switching apparatus as claimed in claim 1 wherein the controller identifies a data flow of each of the bandwidth control queue units by a protocol classification in IEEE802.3.

9. The LAN relaying/switching apparatus as claimed in claim 1 wherein the controller identifies a data flow of the bandwidth control queue unit by an IP address in IPv4.

10. The LAN relaying/switching apparatus as claimed in claim 1 wherein the controller identifies a data flow of the bandwidth control queue unit by an IP address in IPv4 and a port number of either a TCP or a UDP.

11. The LAN relaying/switching apparatus as claimed in claim 1 wherein the controller identifies a data flow of the bandwidth control queue unit by an IP address in IPv6.

12. The LAN relaying/switching apparatus as claimed in claim 1 wherein the controller identifies a data flow of each of the bandwidth control queue units by a flow label in IPv6.

* * * * *